United States Patent
Lai et al.

(10) Patent No.: US 6,317,927 B1
(45) Date of Patent: Nov. 20, 2001

(54) HINGE DEVICE

(75) Inventors: Chin Yi Lai; Chao-Shun Yeh, both of Tu-Chen; Chin-Fa Huang, Kaohsiung; Chia-Heng Tuan Mu, Tu-Chen; Yung Hsiang Cheng, Hsi-Chih; Chieh Lee, Taipei, all of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/452,748

(22) Filed: Dec. 1, 1999

(30) Foreign Application Priority Data

Oct. 26, 1999 (TW) ................................................. 88218166

(51) Int. Cl.[7] .................................................... E05D 11/10
(52) U.S. Cl. .............................................. 16/342; 16/338
(58) Field of Search .............................. 16/347, 337, 340, 16/386; 361/681, 680; 403/65, 103, 83, 84, 145, 247

(56) References Cited

U.S. PATENT DOCUMENTS

| | | | |
|---|---|---|---|
| 5,765,263 | * 6/1998 | Bolinas et al. | 16/342 |
| 5,832,566 | * 11/1998 | Quek et al. | 16/342 |
| 5,894,635 | * 4/1999 | Lu | 16/342 |
| 6,085,388 | * 7/2000 | Kaneko | 16/338 |
| 6,119,310 | * 9/2000 | Ohshima et al. | 16/342 |

* cited by examiner

*Primary Examiner*—Anthony Knight
*Assistant Examiner*—Mark Williams
(74) *Attorney, Agent, or Firm*—Wei Te Chung

(57) ABSTRACT

A hinge device of the present invention comprises a male hinge member, a female hinge member and a resilient tube. The male hinge member includes a connecting shaft at one end, a mounting plate at an opposite end and a shoulder between the connecting shaft and the mounting plate. The connecting shaft of the male hinge device forms a receptacle therein for receiving the resilient tube. Four channels are longitudinally defined in the connecting shaft and equiangularly distributed in the shape of a cross to prevent loss of friction in the hinge device. An arcuate surface is formed at each edge of the channels. The female hinge member includes a sleeve and a mounting plate extending from one end of the sleeve, the sleeve having a receiving opening for receiving the connecting shaft of the male hinge member. A longitudinal slot is defined through the resilient tube for enhancing resiliency and allowing expansion of the resilient tube.

16 Claims, 4 Drawing Sheets

HINGE DEVICE

BACKGROUND OF THE INVENTION

The present invention relates to a hinge device which can be reliably positioned at any of a variety of angles, more particularly, to a durable hinge device which is manually rotated.

The rapid development of portable computers has resulted in requirements for various hinge devices. A hinge device is desired for use in joining a display unit to a mainframe unit of a portable computer while reliably maintaining the two units in a fixed rotational position. Such a hinge device is disclosed in U.S. Pat. No. 5,632,066 and is illustrated in FIG. 5. The hinge device comprises a female connecting member 1, a male connecting member 2 and a plurality of fastening elements (not shown). The female connecting member 1 is fastened to a mainframe unit (not shown) of a portable computer (not shown) and includes a pair of parallel flat walls 12 and 14 and a pair of axle housings 16 connected between the two parallel flat walls 12 and 14. The male connecting member 2 is fastened to a display unit (not shown) of the portable computer and includes a pivot rod 23, a mounting plate 21 extending from an end of the pivot rod 23, and a neck 25 at an opposite end of the pivot rod 23. The neck 25 and the pivot rod 23 extend through the axle housings 16 of the female connecting member 1, the fastening elements being fastened to the neck 25 for holding the female connecting member 1 and the male connecting member 2 together. The pivot rod 23 of the male connecting member 2 fully contacts the inner face of the axle housings 16 of the female connecting member 1 without any intermediate, whereby the hinge device is held in position by a constant frictional force in all rotational positions. However, the frictional force lessens with use and after a time can not support positioning of the display unit relative to the mainframe unit.

The design of the hinge device results in a shortened lifespan for the hinge device, whereby the positioning of the mainframe unit relative to the display unit can not be ensured.

BRIEF SUMMARY OF THE INVENTION

A main object of the present invention is to provide a durable hinge device manually rotated and reliably positioned at any desired angle.

Another object of the present invention is to provide a hinge device for use in a portable computer, which has a resilient tube with a long-lasting resiliency which provides a long useful life for the hinge device.

A hinge device of the present invention comprises a female hinge member, a male hinge member and a resilient tube. The male hinge member includes a hollow connecting shaft at one end, a mounting plate at an opposite end and a shoulder between the connecting shaft and the mounting plate. A plurality of grooves is formed on an outer periphery of the connecting shaft. Four channels are longitudinally defined in the connecting shaft at equiangular positions, the channels as viewed from an end of the connecting shaft being distributed in the shape of a cross, to prevent loss of friction in the hinge device. An arcuate surface is formed at each edge of the channels. A pair of axle holes is defined in the mounting plate for engaging the male hinge member to a mainframe board of a mainframe unit of a portable computer. The female hinge member includes a sleeve and a mounting plate extending from one end of the sleeve. An end of the sleeve adjacent to the mounting plate is closed, and the sleeve has a receiving opening for telescopically receiving the connecting shaft of the male hinge member. A pair of axle holes is defined in the mounting plate for attaching the female hinge member to a display board of a display unit of a portable computer. The resilient tube defines a longitudinal slot for maintaining resiliency and allowing outward expansion of the resilient tube for maintaining tight contact between the connecting shaft of the male hinge member and the sleeve of the female hinge member.

Other objects, advantages and novel features of the invention will become more apparent from the following detailed description when taken in conjunction with the accompanying drawings.

DETAILED DESCRIPTION OF THE INVENTION

Figure 1:
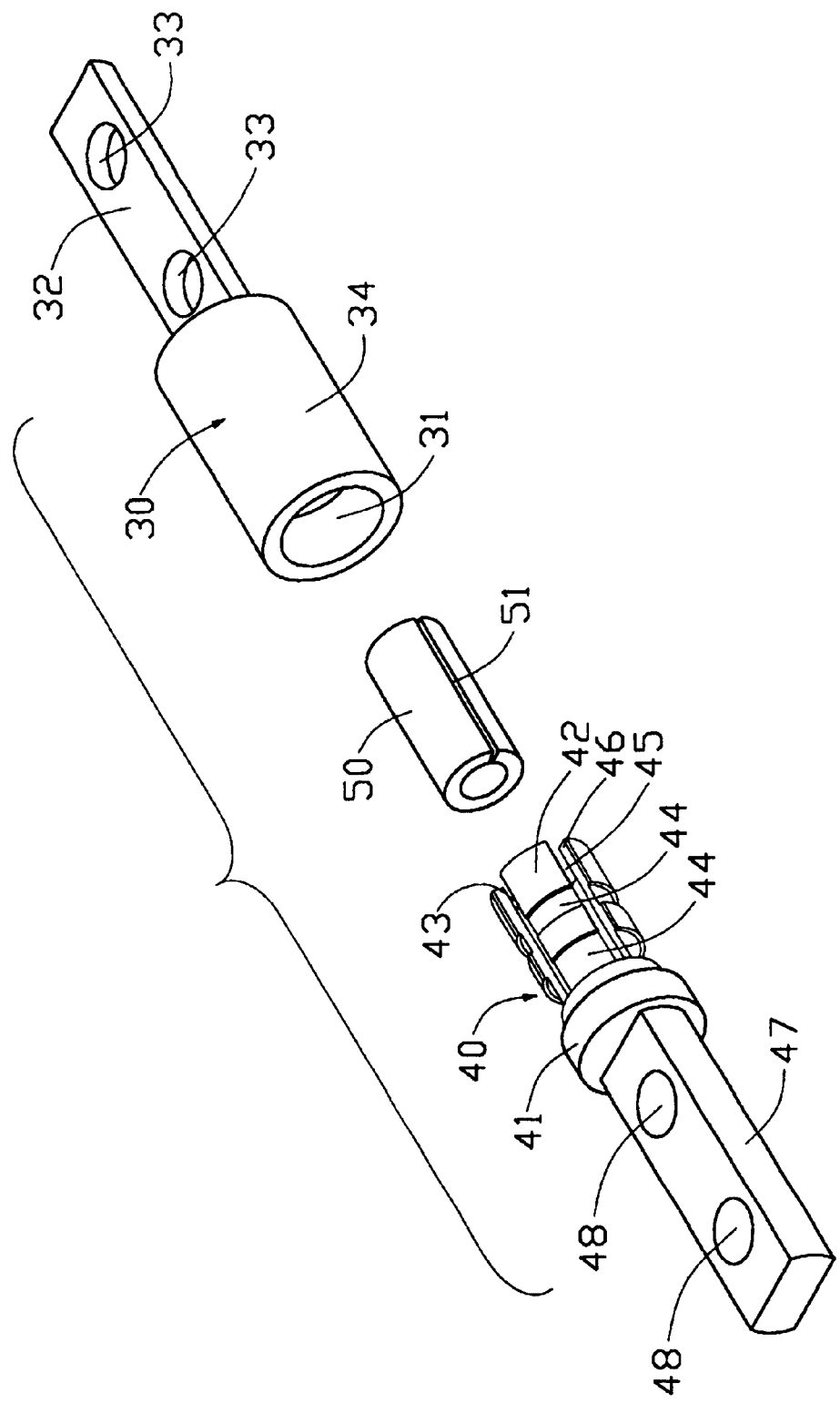
FIG. 1 is an exploded view of a hinge device of the present invention.

Referring to FIG. 1, the hinge device according to the present invention comprises a male hinge member 40, a female hinge member 30 and an elongated resilient tube 50. The male hinge member 40 is unitarily formed and comprises a connecting shaft 42 at one end, a mounting plate 47 at an opposite end and a shoulder 41 between the connecting shaft 42 and the mounting plate 47. The mounting plate 47 is flat and axially extends from substantially a middle of the shoulder 41. A pair of axle holes 48 is defined in the mounting plate 47 for engaging the male hinge member 40 to a mainframe board 10 of a mainframe unit 11 of a portable computer. The connecting shaft 42 is annular in construction and axially defines a cylindrical receptacle 43 though a center thereof. A plurality of grooves 44 is radially defined on a periphery of the connecting shaft 42 for reducing the contacting domain of the male hinge member 40 and the female hinge member 30. Four channels 45 are longitudinally defined in the connecting shaft 42 at equiangular positions, the channels viewed from an end of the connecting shaft 42 being distributed in the shape of a cross to prevent loss of friction in the hinge device. The equiangular distribution of the channels 45 results in a balanced resiliency of the connecting shaft 42, whereby the resiliency is substantially even in all rotational directions. An arcuate surface 46 is formed at each edge of the channels 45.

Also referring to FIG. 1, the female hinge member 30 includes a sleeve 34 and a mounting plate 32 extending from one end of the sleeve 34 with a step section 35 intermediate the sleeve 34 and the mounting plate 32. The sleeve 34 is cylindrical and has a closed end adjacent to the mounting plate 32, and the sleeve 34 has a receiving opening 31 for receiving the connecting shaft 42 of the male hinge member 40. A pair of axle holes 33 is defined in the mounting plate 32 for engaging the female hinge member 30 to a display board 20 of a display unit 21 of a portable computer. The resilient tube 50 has an annular cross-section and is received in the receptacle 43 of the male hinge member 40, a longitudinal slot 51 being defined along the resilient tube for enhancing the resiliency and allowing outward expansion of the resilient tube 50.

Figure 3:
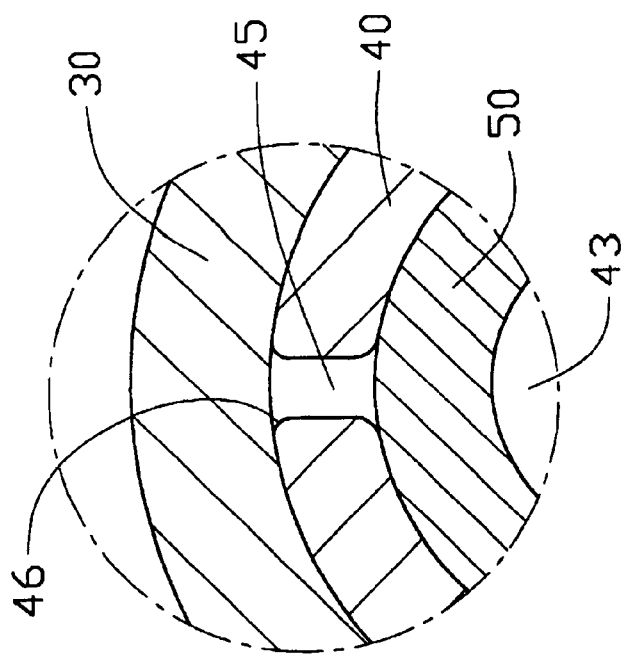
FIG. 3 is a partial, enlarged view of FIG. 2.
Figure 2:
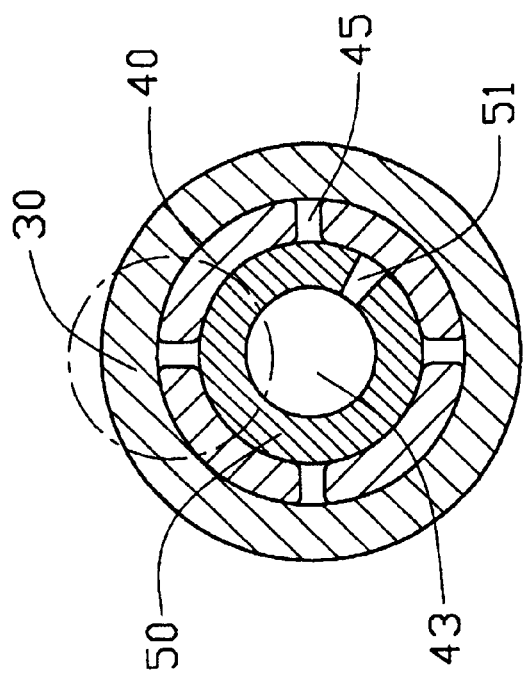
FIG. 2 is an assembled, cross-sectional view of the hinge device in FIG. 1.
Figure 4:
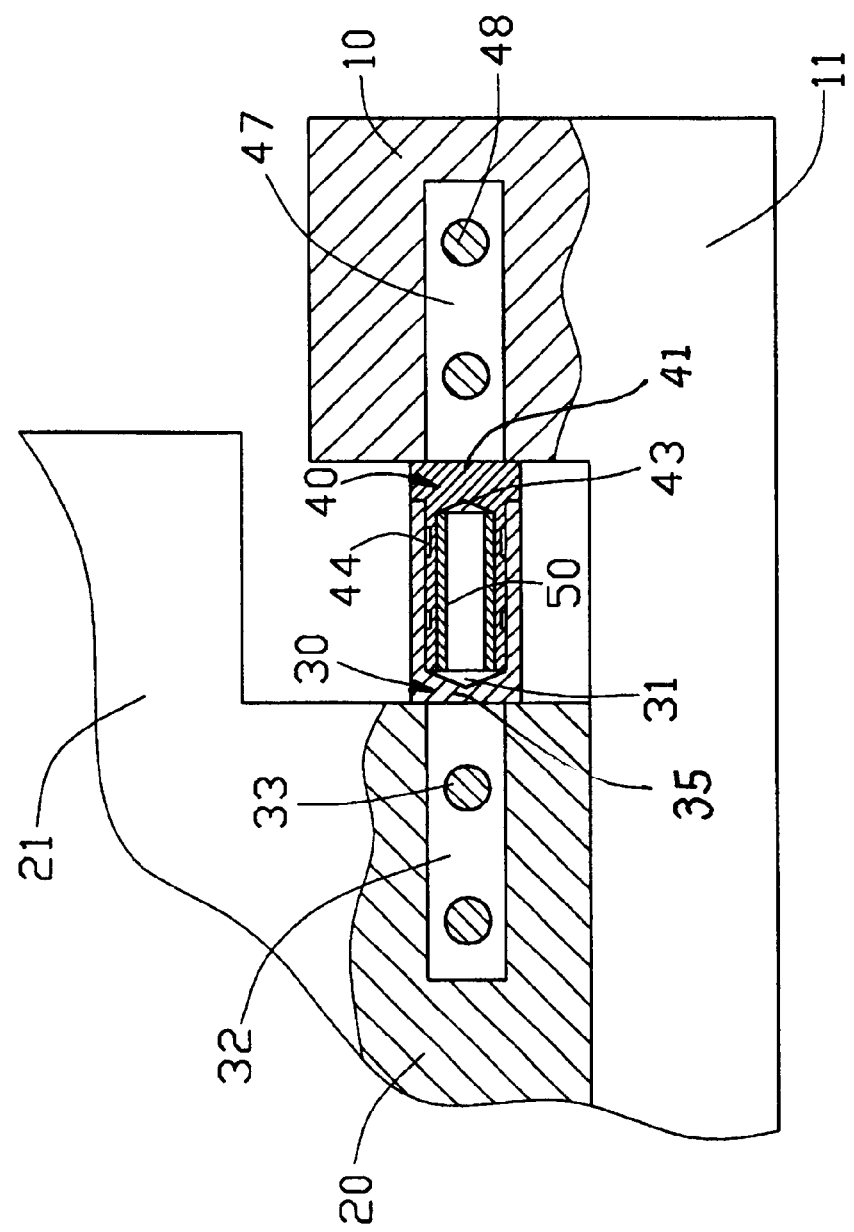
FIG. 4 is an assembled, cross-sectional view of the hinge device taken along its axis.
Figure 5:
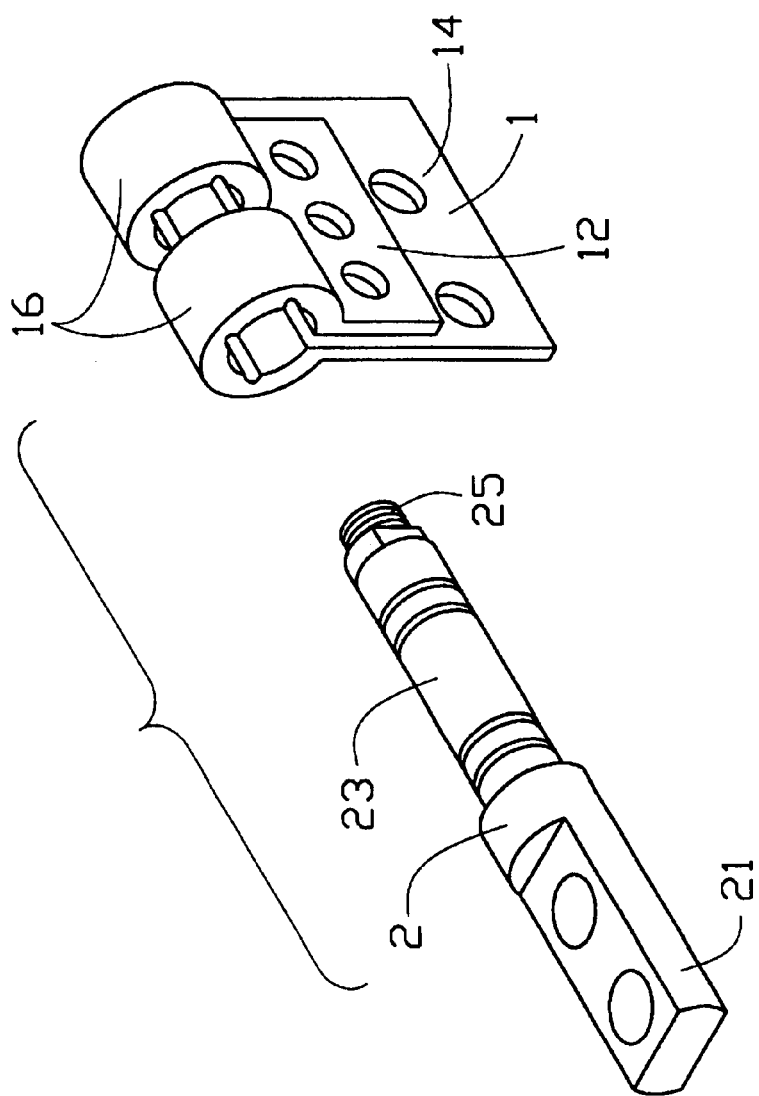
FIG. 5 is an exploded view of a conventional hinge device.

In assembly, referring to FIGS. 2 and 3, the resilient tube 50 is wholly inserted into the receptacle 43 of the male hinge member 40, an outer periphery of the resilient tube 50 pressing against an inner periphery of the connecting shaft 42 due to the resiliency produced by the longitudinal slot 51 of the resilient tube 50. The connecting shaft 42 of the male hinge member 40 is inserted into the receiving opening 31 of the female hinge member 30, an outer periphery of the connecting shaft 42 abutting against an inner periphery of the sleeve 34. The grooves 44 establish an incomplete contact between the connecting shaft 42 and the sleeve 34, resulting in decreased friction therebetween. The resiliency and expansion of the resilient tube 50 further helps encourage firm contact between the connecting shaft 42 of the male hinge member 40 and the sleeve 34 of the female hinge member 30, thereby ensuring reliable positioning at any desired angle of the display unit 21 with respect to the mainframe unit 11. Additionally, the arcuate surfaces 46 on the connecting shaft 42 facilitate a smooth contact between the edges of the channels 45 and an inner periphery of the sleeve 34 of the female hinge member 30 and a smooth contact between the edges of the channels 45 and an outer periphery of the resilient tube 50.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge device comprising:
    a male hinge member including a mounting plate adapted to be fixed to a mainframe board of a mainframe unit of a portable computer, a hollow connecting shaft, and a shoulder between the connecting shaft and the mounting plate, a plurality of longitudinal channels being equiangularly distributed on the connecting shaft;
    a female hinge member including a mounting plate adapted to be fixed to a display board of a display unit of the portable computer and a sleeve telescopically receiving the connecting shaft of the male hinge member; and
    a resilient tube defining a longitudinal slot through a periphery thereof and received within the connecting shaft of the male hinge member, the resilient tube circumferentially biasing the connecting shaft against the sleeve of the female hinge member for reliably positioning the male hinge member relative to the female hinge member at a desired angular position.

2. The hinge device as claimed in claim 1, wherein four channels are longitudinally defined in the connecting shaft and equiangularly distributed in the shape of a cross to prevent loss of friction in the hinge device.

3. The hinge device as claimed in claim 2, wherein an arcuate surface is formed at each edge of the channels for facilitating a smooth contact between the edges of the channels and an inner periphery of the sleeve of the female hinge member and a smooth contact between the edges of the channels and an outer periphery of the resilient tube.

4. The hinge device as claimed in claim 1, wherein a plurality of grooves is radially defined on an outer periphery of the connecting shaft for reducing the contacting domain of the male hinge member and the female hinge member.

5. The hinge device as claimed in claim 1, wherein the mounting plate of the male hinge member defines a plurality of axle holes therein for receiving a bolt to engage the mounting plate with the mainframe board.

6. The hinge device as claimed in claim 1, wherein the mounting plate of the female hinge member defines a plurality of axle holes therein for receiving a bolt to engage the mounting plate with the display board.

7. A hinge device comprising:
    a male hinge member including a first mounting plate and a hollow radially expandable connecting shaft;
    a female hinge member including a second mounting plate and a sleeve telecopically receiving the connecting shaft; and
    a radially resilient member snugly coaxially received within the connecting shaft; wherein
    said resilient member constantly circumferentially urges the radially expandable connecting shaft to abut against the sleeve thereabouts.

8. The hinge device as claimed in claim 7, wherein a longitudinal slot is formed in the resilient member along an axial direction thereof.

9. The hinge device as claimed in claim 7, wherein a plurality of longitudinal channels are equiangularly distributed along the connecting shaft.

10. The hinge device as claimed in claim 7, wherein said male hinge member further defines a shoulder between said first mounting plate and the connecting shaft, said female hinge member defines a step between the second mounting plate and the sleeve, and said resilient member is restrained between said shoulder and said step in an axial direction thereof.

11. The hinge device as claimed in claim 7, wherein said first mounting plate and said second mounting plate generally oppositely extend along an axial direction of the resilient member.

12. A computer comprising:
    a main frame unit and a display unit pivotably attached to the main frame with a space therebetween;
    a hinge device including:
        a male hinge member including a first mounting plate mounted to one of said main frame unit and said display unit, and a hollow radially expandable connecting shaft;
        a female hinge member including a second mounting plate mounted to the other of said main frame unit and said display unit, and a sleeve telecopically receiving the connecting shaft; and
        a radially resilient member snugly coaxially received within the connecting shaft; wherein
        said resilient member constantly circumferentially urges the radially expandable connecting shaft to abut against the sleeve thereabouts, and said sleeve, said connecting shaft and said resilient member are all positioned in said space.

13. The hinge device as claimed in claim 12, wherein a longitudinal slot is formed in the resilient member along an axial direction thereof.

14. The hinge device as claimed in claim 12, wherein a plurality of longitudinal channels are equiangularly distributed along the connecting shaft.

15. The hinge device as claimed in claim 12, wherein said male hinge member further defines a shoulder between said first mounting plate and the connecting shaft, said female hinge member defines a step between the second mounting plate and the sleeve, and said resilient member is restrained between said shoulder and said step in an axial direction thereof.

16. The hinge device as claimed in claim 12, wherein said first mounting plate and said second mounting plate generally oppositely extend along an axial direction of the resilient member.

\* \* \* \* \*